(12) United States Patent
Hess et al.

(10) Patent No.: US 11,180,103 B2
(45) Date of Patent: Nov. 23, 2021

(54) FRONTAL AIRBAG SYSTEMS

(71) Applicant: Autoliv ASP, Inc., Ogden, UT (US)

(72) Inventors: Travis Hess, Farr West, UT (US); Yutaka Hirota, Yokohama (JP); Akira Koizumi, Yokohama (JP); Christopher Banatin, Yokohama (JP); Derrick Staheli, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 16/665,953

(22) Filed: Oct. 28, 2019

(65) Prior Publication Data

US 2021/0122319 A1  Apr. 29, 2021

(51) Int. Cl.
| | |
|---|---|
| *B60R 21/203* | (2006.01) |
| *B60R 21/2338* | (2011.01) |
| *B60R 21/2346* | (2011.01) |
| *B60R 21/239* | (2006.01) |
| *B60R 21/215* | (2011.01) |
| *B60R 21/00* | (2006.01) |

(52) U.S. Cl.
CPC ........ *B60R 21/2035* (2013.01); *B60R 21/239* (2013.01); *B60R 21/2338* (2013.01); *B60R 21/2346* (2013.01); *B60R 21/215* (2013.01); *B60R 2021/0048* (2013.01)

(58) Field of Classification Search
CPC ............ B60R 21/2035; B60R 21/2338; B60R 21/2346; B60R 21/239; B60R 21/215; B60R 2021/0048
See application file for complete search history.

(56) References Cited

U.S. PATENT DOCUMENTS

| | | | |
|---|---|---|---|
| 6,302,433 B1 | 10/2001 | Ellerbrok et al. | |
| 6,610,000 B1 * | 8/2003 | Ishii | B60R 21/201 |
| | | | 280/728.1 |

(Continued)

FOREIGN PATENT DOCUMENTS

| | | |
|---|---|---|
| DE | 102014001781 | 8/2015 |
| JP | 9263204 | 10/1997 |

(Continued)

OTHER PUBLICATIONS

International Search Report and Written Opinion dated Dec. 1, 2020 for international application PCT/US2020/055591.

*Primary Examiner* — Drew J Brown
(74) *Attorney, Agent, or Firm* — Stoel Rives LLP

(57) ABSTRACT

An inflatable airbag system can be configured to be mounted to a frontal region of a vehicle. The inflatable airbag system includes a housing configured to be mounted on a steering wheel of a vehicle and an inflator assembly at least partially disposed within the housing. The inflatable airbag system includes an airbag that receives inflation gas from the inflator assembly to expand and deploy out of the housing from a packaged configuration to a deployed configuration to provide occupant crash protection during a collision event, the airbag defining an inflatable chamber. A diffuser is disposed within the inflatable chamber and is in fluid communication with the inflator assembly. An occupant-facing panel of the diffuser comprises an aperture disposed in the center of the occupant-facing panel of the diffuser.

19 Claims, 6 Drawing Sheets

(56) References Cited

U.S. PATENT DOCUMENTS

| | | | |
|---|---|---|---|
| 8,764,057 B1* | 7/2014 | Jamison | B60R 21/233 280/743.1 |
| 9,676,362 B1 | 6/2017 | Deng et al. | |
| 2002/0005639 A1 | 1/2002 | Varcus | |
| 2003/0151233 A1 | 8/2003 | Varcus | |
| 2004/0164526 A1* | 8/2004 | Hasebe | B60R 21/233 280/729 |
| 2005/0052008 A1 | 3/2005 | Rose et al. | |
| 2005/0073139 A1 | 4/2005 | Fischer et al. | |
| 2005/0116455 A1* | 6/2005 | Abe | B60R 21/233 280/743.1 |
| 2005/0285379 A1* | 12/2005 | Soderquist | B60R 21/233 280/740 |
| 2006/0249934 A1* | 11/2006 | Hasebe | B60R 21/233 280/729 |
| 2007/0222196 A1 | 9/2007 | Harvey et al. | |
| 2008/0048420 A1* | 2/2008 | Washino | B60R 21/231 280/731 |
| 2008/0073890 A1* | 3/2008 | Williams | B60R 21/239 280/739 |
| 2008/0073892 A1* | 3/2008 | Rose | B60R 21/239 280/739 |
| 2008/0303256 A1* | 12/2008 | Williams | B60R 21/239 280/742 |
| 2012/0126516 A1 | 5/2012 | Choi et al. | |
| 2013/0221645 A1 | 8/2013 | Yamada | |
| 2014/0265280 A1* | 9/2014 | Borton | B60R 21/2346 280/743.2 |
| 2014/0284905 A1* | 9/2014 | Yamaji | B60R 21/239 280/729 |
| 2014/0375035 A1* | 12/2014 | Fukawatase | B60R 21/231 280/731 |
| 2015/0137489 A1 | 5/2015 | Vinton | |
| 2015/0239422 A1* | 8/2015 | Ishiguro | B60R 21/2338 280/731 |
| 2015/0283972 A1* | 10/2015 | Fischer | B60R 21/239 280/740 |
| 2016/0121840 A1 | 5/2016 | Iida | |
| 2017/0057455 A1* | 3/2017 | Lachat | B60R 21/239 |
| 2018/0001865 A1 | 1/2018 | Ooka et al. | |
| 2019/0001915 A1 | 1/2019 | Hotta et al. | |
| 2020/0101928 A1 | 4/2020 | Ishii et al. | |

FOREIGN PATENT DOCUMENTS

| | | |
|---|---|---|
| JP | 10100838 | 4/1998 |
| JP | 2000127881 | 5/2000 |
| JP | 200229354 | 1/2002 |
| JP | 2002053000 | 2/2002 |
| JP | 2002362274 | 12/2002 |
| JP | 2004148858 | 5/2004 |
| JP | 20115923 | 1/2011 |
| JP | 2011126307 | 6/2011 |
| JP | 2014065433 | 4/2014 |
| JP | 201688173 | 5/2016 |
| JP | 2016112996 | 10/2019 |
| KR | 20100064837 | 6/2010 |
| WO | 2000015472 | 3/2000 |
| WO | 2006132071 | 12/2006 |
| WO | 2006132280 | 12/2006 |
| WO | 2007067371 A2 | 6/2007 |
| WO | 2009056598 | 5/2009 |
| WO | 2009146220 | 12/2009 |
| WO | 2016168124 | 10/2016 |

* cited by examiner

FRONTAL AIRBAG SYSTEMS

TECHNICAL FIELD

The present disclosure relates generally to the field of automotive protective systems. More specifically, the present disclosure relates to frontal airbag systems that are configured to deploy in response to frontal collision events.

BACKGROUND

Inflatable airbags may be mounted within a vehicle and deploy during a collision event. The deployed airbag may cushion an occupant and prevent detrimental impact with other vehicular structures.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
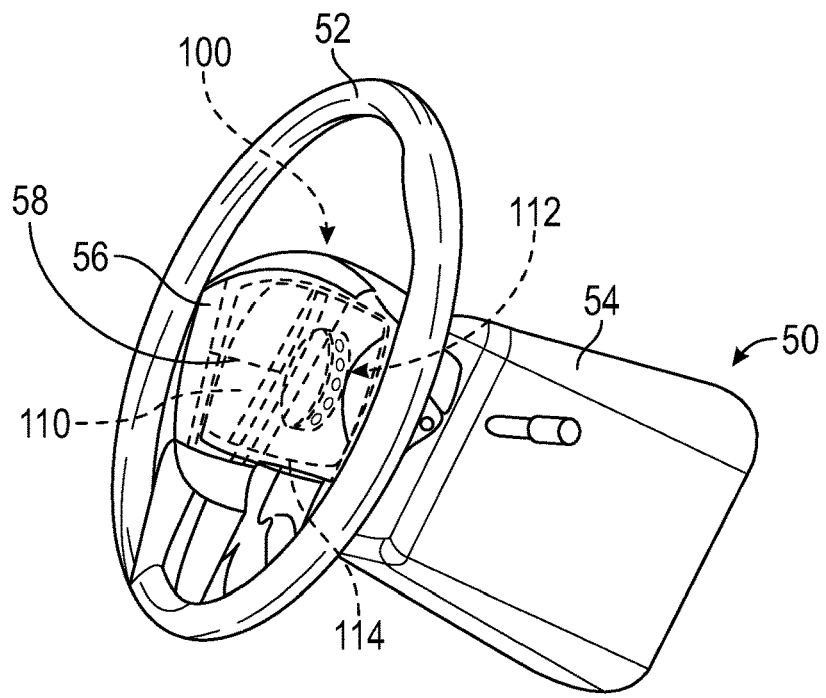
FIG. 1 is a perspective view of an embodiment of an airbag assembly mounted in a vehicle, wherein an embodiment of an airbag is shown in a packaged or undeployed configuration.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in the drawings, the drawings are not necessarily drawn to scale unless specifically indicated.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a driver airbag that is typically housed within the steering wheel, steering column, or dashboard, although the principles discussed may apply to other types of airbags (e.g., passenger airbags, knee airbags, and side airbags).

Front airbags are often installed in a steering wheel, dashboard, or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a driver occupant and may be mounted in a steering wheel or steering column. An airbag assembly can mitigate injury to an occupant of a vehicle during a collision event by reducing the effect of impact of the occupant against structures (body-structure impact) within the vehicle (such as, e.g., a dashboard or door column). While airbag assemblies are useful in mitigating such injuries, occupant impact on an airbag assembly introduces a risk for other injuries. For example, prior to a collision event, an occupant's head is in motion synchronously with the vehicle. During the collision event, the vehicle's direction of travel and speed may be altered severely and abruptly. When such a collision triggers the deployment of an airbag cushion from an airbag assembly, the airbag cushion accelerates in a direction specifically relative to the vehicle. That is, a frontal airbag will deploy nominally rearward from the dashboard.

Figure 2:
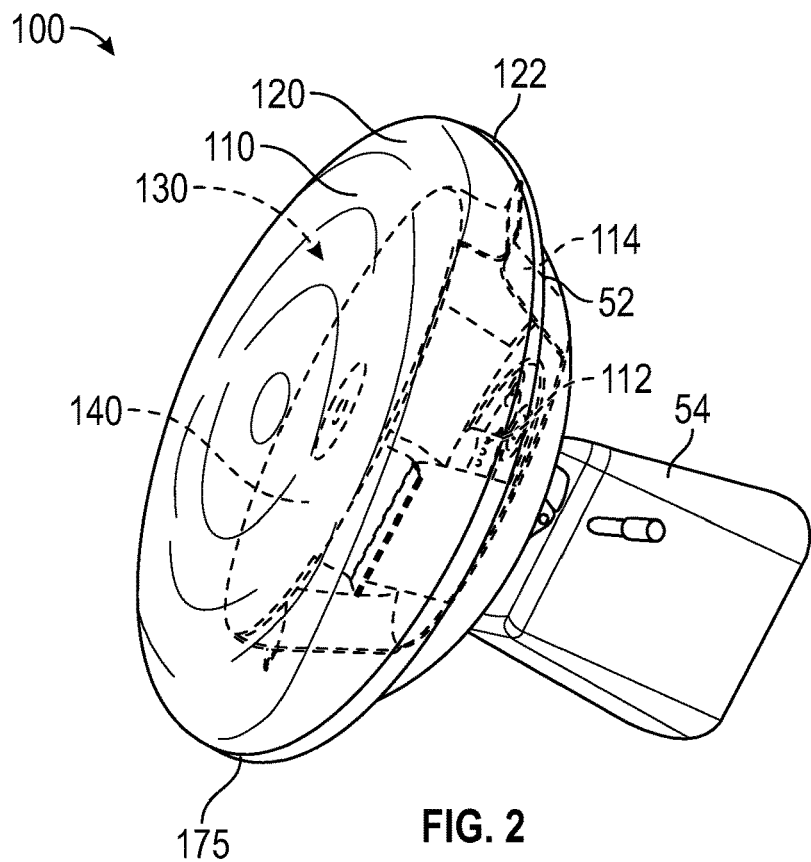
FIG. 2 is a perspective view of the airbag assembly of FIG. 1 showing the airbag in a deployed configuration.

FIGS. 1-2 depict an airbag assembly 100 in two different configurations. FIG. 1 depicts the airbag assembly 100 in a packaged or undeployed configuration, and FIG. 2 depicts the airbag assembly 100 in a deployed and inflated configuration. FIGS. 1-2 further depict a steering wheel 52 and a steering column 54 of a vehicle 50. The steering wheel 52 includes a cover 56, behind which the airbag assembly 100 is located. The cover 56 may be of any suitable variety and may include a tear seam or burst seam 58 through which an airbag can deploy.

The airbag assembly 100 can include an inflatable airbag 110, an inflator 112, and an airbag housing 114. In the illustrated embodiment, the airbag 110 includes a cushioning panel 120, which in the deployed and inflated configuration is generally directed toward an occupant or an occupant position (e.g., a vehicle seat), and may at least partially define a cabin side of the airbag 110. A base panel 122 is located opposite the cushioning panel 120. In the illustrated embodiment, the base panel 122 is adjacent to the steering wheel 52 when the airbag 110 is in the deployed and inflated configuration. The cushioning panel 120 and the base panel 122 may also be referred to as a rear panel 120 and a front panel 122, in view of the relative positions of these panels within the vehicle 50 when the airbag 110 is deployed. The base panel 122 and the cushioning panel 120 cooperate to define an inflatable chamber 130 when coupled together by a seam 175. The panels 120, 122 may also be referred to as airbag cushion membranes and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

The airbag 110 may further include a diffuser 140 that is configured to direct inflation gases from the inflator 112 in a desired manner or pattern during deployment of the airbag 110, as discussed further below. The diffuser 140 may be formed of any suitable material, such as, for example, any of the materials discussed above with respect to the panels 120, 122. For example, in some embodiments, the diffuser 140 and the panels 120, 122 may be formed of the same material. In other embodiments, the diffuser 140 may be formed of a material that is stiffer, thicker, stronger, and/or more heat resistant than the material of which the panels 120, 122 are formed, and yet may still be folded and/or rolled into a packaged configuration. In some embodiments, the diffuser 140 may include a woven nylon material, which in further embodiments may be coated with one or more materials, such as silicone.

Figure 3:
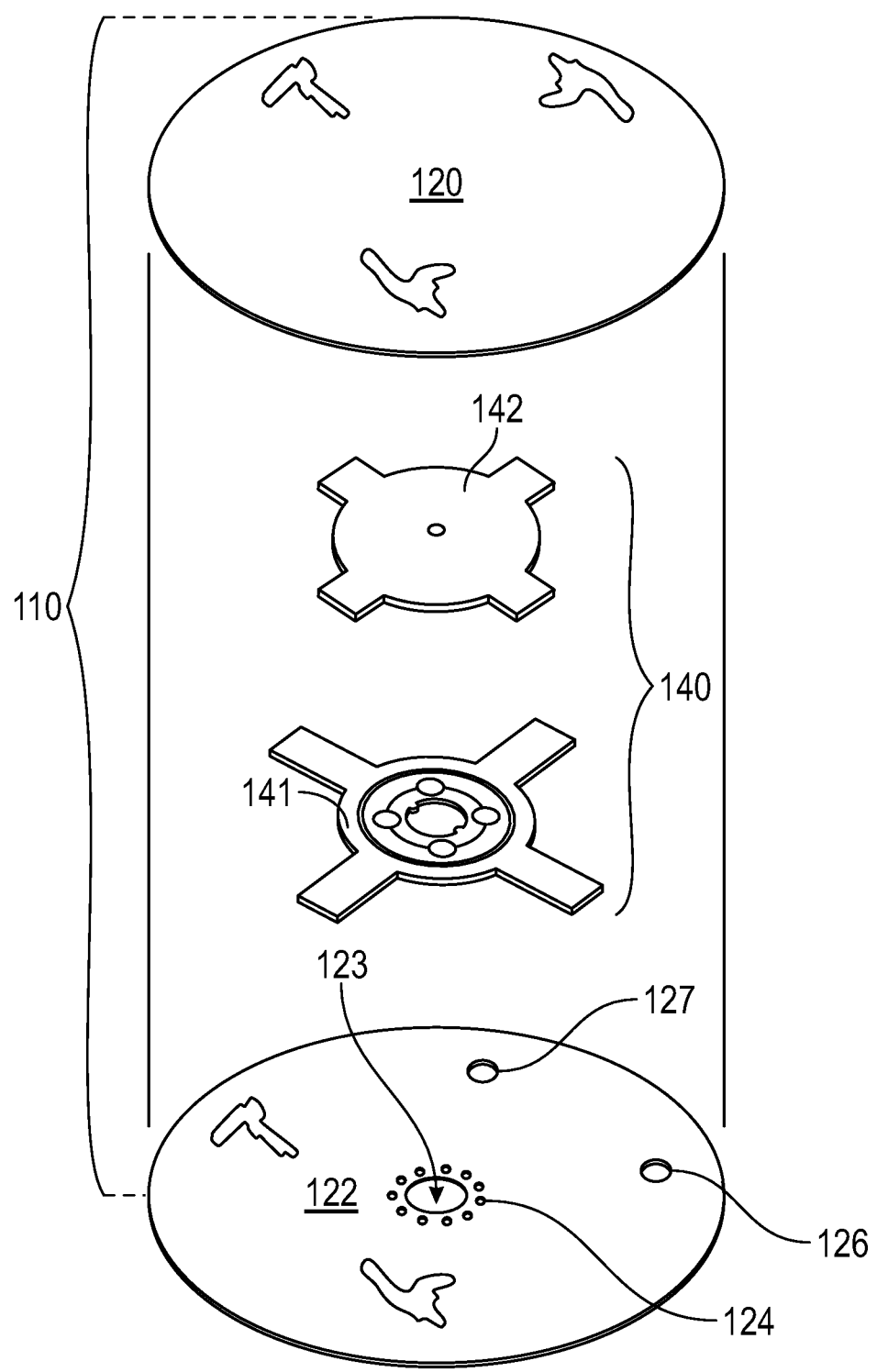
FIG. 3 is an exploded perspective view of the airbag assembly of FIG. 2.

FIG. 3 depicts an exploded view of the airbag 110, or stated otherwise, the airbag 110 is shown in an unassembled configuration. In the illustrated embodiment, the cushioning panel 120 and the base panel 122 are each substantially circular and are the same size, such that their peripheries substantially overlap or align with each other if the cushioning panel 120 is placed on top of the base panel 122. As previously mentioned, the base panel 122 and the cushioning panel 120 can cooperate to define the inflatable chamber 130. The cushioning panel 120 and the base panel 122 can be joined together in any suitable manner such as via the seam 175. The seam 175 may be of any suitable variety, whether sealed or unsealed, and may be formed via stitching, one or more adhesives, taping, welding (e.g., radio frequency welding), heat sealing, or any other suitable technique or combination of techniques, and thus the seam 175 may comprise one or more stitches, welds (e.g., radio frequency weldings), and/or adhesives. In some embodiments, the seam 175 may comprise a single row of stitches. In other embodiments, the seam 175 may include multiple rows of stitches, which may aid in reinforcing the seam 175.

During assembly of the airbag 110, in some embodiments, the exterior surfaces of the panels 120, 122 are positioned to face one another and the seam 175 is formed about the periphery of the panels 120, 122. The panels 120, 122 can subsequently be inverted such that the seam 175 is at an interior of the airbag 110.

The cushioning panel 120 may be configured to expand to define a cushion for receiving a head and/or torso or a passenger. In the illustrated embodiment, the cushioning panel 120 is substantially dome-shaped when in the inflated configuration and may be circularly or rotationally symmetric. Any other suitable shape or configuration of the cushioning panel 120 is within the scope of this disclosure.

The base panel 122 may define an inflator opening 123 that is configured to be coupled with the inflator 112. For example, in some embodiments, the inflator opening 123 is sized to receive at least a portion of the inflator 112. In other embodiments, the inflator opening 123 may be fluidly coupled with the inflator 112, without being physically coupled to the inflator 112. For example, in other embodiments, the inflator 112 may not extend through the inflator opening 123 but may be positioned to introduce inflation gas into the airbag 110 through the inflator opening 123.

The base panel 122 may define one or more mounting apertures 124 through which mounting hardware (not shown) can extend. Any suitable mounting hardware is possible, such as bolts, screws, etc. The mounting apertures 124 may be used to secure the base panel 122 directly to the airbag housing 114, which may in turn be secured to any suitable portion of the vehicle 50, such as via a mounting bracket. In other embodiments, the mounting hardware that is inserted through the mounting apertures 124 may be directly attached to both the base panel 122 and the airbag housing 114 to the vehicle 50.

The base panel 122 may further define one or more venting apertures 126, 127. The venting apertures 126, 127 may permit passive venting, such as when a vehicle occupant is cushioned by the airbag 110 during ride down.

The diffuser 140 may be shaped and/or attached to the base panel 122 in a manner suitable for achieving a desired fill pattern for the airbag 110. The diffuser 140 may be coupled to the base panel 122 via one or more seams. The diffuser 140 may comprise a first panel 141 and a second panel 142, which are described in more detail below. The diffuser 140 is depicted in an exploded view.

Figure 4:
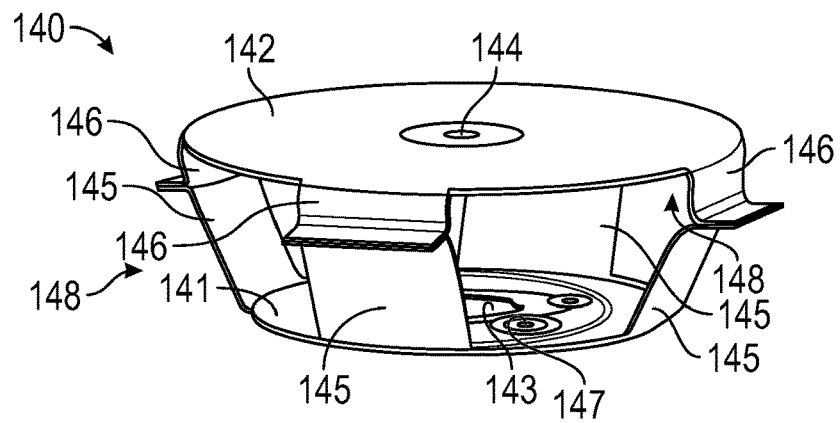
FIG. 4 is a perspective view of a diffuser to redirect inflation gas during deployment of an airbag, according to one embodiment.
Figure 5:
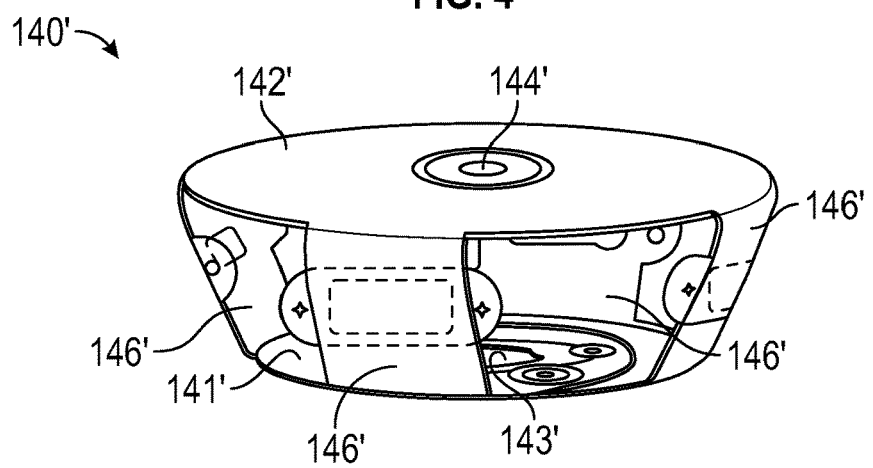
FIG. 5 is a perspective view of a diffuser to redirect inflation gas during deployment of an airbag according to one embodiment.

FIGS. 4 and 5 depict a couple of different embodiments of the diffuser 140. The diffuser 140 of FIG. 4 comprises a first panel 141 and a second panel 142. In some embodiments, the first panel 141 may be described as a bottom panel or a vehicle-facing panel, and the second panel 142 may be described as a top panel or an occupant-facing panel. The second panel 142 is configured to redirect inflation gas from the inflator 112 laterally through a plurality of holes 148 through a side of the diffuser 140. Accordingly, the inflation gas from the inflator 112 does not immediately engage or impact the cushioning panel 120 which lessens the pressure a passenger will encounter when the passenger impacts the airbag 110 during a collision event.

The first panel 141 and the second panel 142 may be substantially circular. However, the first panel 141 and the second panel 142 may have a variety of different shapes, such as triangular, square, rectangular, trapezoidal, polygonal, and the like. In some embodiments, such as in the illustrated embodiment, the first panel 141 and the second panel 142 have a similar shape, circular. However, in some embodiments, the first panel 141 may have a different shape from the second panel 142. Further, the first panel 141 has a diameter that is less than the diameter of the second panel 142.

The first panel 141 may define an inflator opening or aperture 143 that is configured to be coupled with the inflator 112 and/or in fluid communication with the inflator 112. The inflator aperture 143 may be disposed in the center of the first panel 141. In some embodiments, the inflator aperture 143 is sized to receive at least a portion of the inflator 112. In other embodiments, the inflator aperture 143 may be fluidly coupled with the inflator 112, without being physically coupled to the inflator 112. For example, in other embodiments, the inflator 112 may not extend through the inflator aperture 143 but may be positioned to introduce inflation gas into the airbag 110 through the inflator aperture 143.

The first panel 141 may further include a plurality of arms 145 that extend from a perimeter of the first panel 141. In the illustrated embodiment, the first panel 141 has four arms 145 that are equally radially spaced apart from each other. However, the first panel 141 may include more or less than four arms.

The first panel 141 may define one or more mounting apertures 147 through which mounting hardware (not shown) can extend. Any suitable mounting hardware is possible, such as bolts, screws, etc. The mounting apertures 147 may be used to secure the first panel 141 and the base panel 122 directly to the airbag housing 114, which may in turn be secured to any suitable portion of the vehicle 50, such as via a mounting bracket. Accordingly, the mounting apertures 147 may correspond with the mounting apertures 124 of the base panel 122.

The second panel 142 may define an aperture 144 that is disposed in a center of the second panel 142. The aperture 144 in the second panel 142 can increase the deployment timing of the cushioning panel 120 because inflation gas accesses the cushioning panel 120 faster than if there was no aperture 144. In some embodiments, the aperture 144 is disposed in a location other than the center of the second panel 142. The position of the aperture 144 in the second panel 142 may control or influence the deployment direction of the cushioning panel 120. For example, in some embodiments, the aperture 144 is disposed in the second panel 142 closer to a bottom edge of the second panel 142 than a top edge, which causes the diffuser to deploy downward away from the vent holes 126, 127. In some embodiments, the aperture 144 is disposed in the second panel 142 closer to the top edge of the second panel 142 than the bottom edge, which causes the diffuser to deploy upward toward the vent holes 126, 127 to increase the pressure within the airbag 110. In some embodiments, the second panel 142 may include a plurality of apertures 144 that are disposed in various locations of the second panel 142. The location of the plurality of apertures may be designed to control or influence the deployment direction of the diffuser 140 during deployment of the airbag 110. As will be discussed in additional detail below, the aperture 144 in the second panel 142 is configured to allow flow (e.g., limited passage) of inflation gas through the aperture 144. The aperture 144 is designed to be aligned and concentric with the inflator aperture 143 in a packaged configuration and in the deployed configuration. In some embodiments, a diameter of the aperture 144 is less than the diameter of the inflator aperture 143 or the inflator assembly 112 output.

The second panel 142 may further include a plurality of arms 146 that extend from a perimeter of the second panel 142. The second panel 142 has four arms 146 that may be equally radially spaced apart from each other. In the illustrated embodiment, one of the arms 146 is hidden by the second panel 142. However, the second panel 142 may include more or less than four arms. In some embodiments, the second panel 142 has the same number of arms 146 as the first panel 141. The plurality of arms 146 of the second panel 142 couple to a corresponding arm of the plurality of arms 145 of the first panel 141. The coupling of the plurality of arms 146 of the second panel 142 and the plurality of arms 145 of the first panel 141 creates a plurality of arms that couple the first panel 141 and the second panel 142 together. A plurality of openings 148 are disposed between adjacent coupled arms, providing a flow path for the inflation gas, including after it encounters the second panel 142. The openings 148 may be equally radially spaced apart around a perimeter of the first panel 141 and the second panel 142.

In a deployed configuration, the second panel 142 is spaced apart from the first panel 141. In other words, the second panel pops out away from the first panel 141. The inflation gas from the inflator 112 pushes the second panel 142 away from the first panel 141, and the second panel 142 redirects the inflation gas toward one of the openings 148. The second panel 142 is spaced apart from the first panel 141 up to the length of the coupled arms 145, 146.

FIG. 5 depicts an embodiment of a diffuser 140' that resembles, in certain respects, the diffuser 140 of FIG. 4 described above. Accordingly, like features are designated with like reference numerals, with an apostrophe added. For example, the embodiment depicted in FIG. 5 includes a first panel 141' and a second panel 142' that may, in some respects, resemble the first panel 141 and the second panel 142 of FIG. 4. Relevant disclosure set forth above regarding similarly identified features thus may not be repeated hereafter. Moreover, specific features of the diffuser 140 and related components shown in FIG. 4 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the diffuser 140' and related components depicted in FIG. 5. Any suitable combination of the features, and variations of the same, described with respect to the diffuser 140 and related components illustrated in FIG. 4 can be employed with the diffuser 140' and related components of FIG. 5, and vice versa. This pattern of disclosure applies equally to further embodiments depicted in subsequent figures and described hereafter. The diffuser 140' of FIG. 5, the arms of the top panel 142' and the arms of the bottom panel 141' are integral with each other and are a single piece of fabric.

Figure 6:
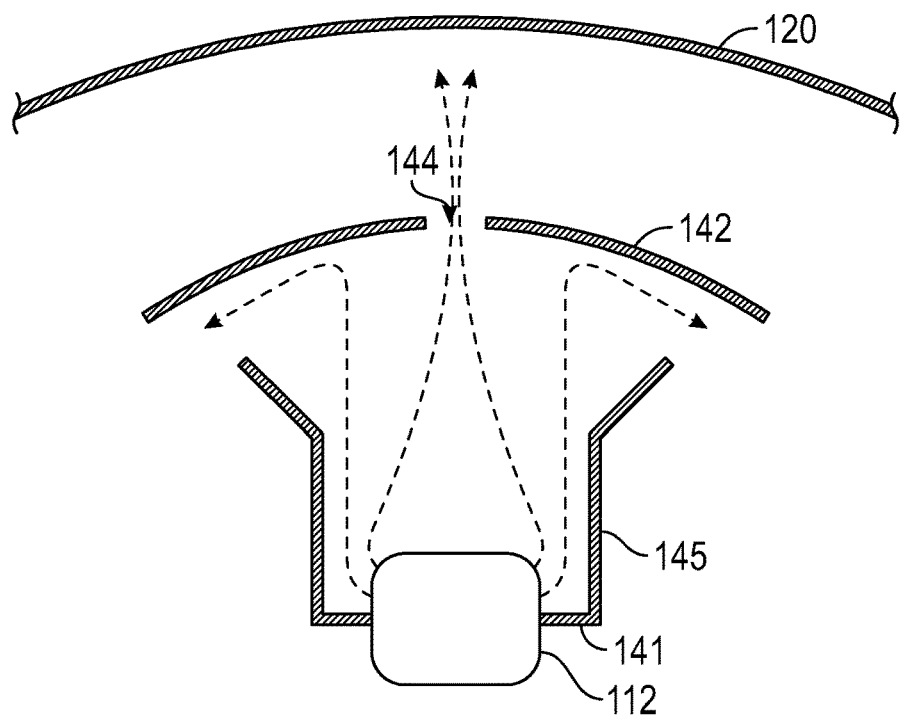
FIG. 6 is a schematic view of the deployment of an airbag and diffuser and the potential flow paths of the inflation gas during deployment.

FIG. 6 is a schematic view of the deployment of the airbag 110 and of inflating the airbag 110 with inflation gas. During deployment of the airbag 110, inflation gas is released from the inflator 112 and the inflation gas follows a flow path. The inflation gas can flow through the aperture 144 or the inflation gas may encounter the second panel 142 and the second panel 142 redirects the inflation gas toward one of the plurality of openings 148 on the lateral side of the diffuser 140. Because the aperture 144 is small, only a small or limited portion of the inflation gas may flow through the aperture 144; therefore, a majority of the inflation gas may flow through the openings 148, directing the inflation gas laterally or radially and away from an occupant. As discussed above, the diameter of the aperture 144 is less than the diameter of the inflator assembly 112 or the inflator aperture 143 (see FIG. 4), which may result in limiting the airflow through the aperture 144 (at least limited relative to the flow from the inflator aperture 143).

The aperture 144 in the second panel 142 can provide several benefits. For example, if the diffuser 140 does not have an aperture 144 in the second panel 142, then during deployment of the airbag 110 and the diffuser 140, the diffuser 140 tends to overlap with one of the vent holes 126, 127 of the base panel 122, as illustrated in FIG. 6.

The vent holes 126, 127 are placed within the steering wheel 52 because placement outside of the steering wheel 52 may lead to high temperature inflation gas encountering the hands of an occupant. Accordingly, the vent holes 126, 127 and the diffuser 140 occupy similar space within the airbag 110. If the diffuser 140 overlaps with one of the vent holes 126, 127, then the venting of the inflation gas out of the vent holes 126, 127 during ride down is affected, which can spike the pressure within the airbag 110 during the ride down process.

Figure 7:
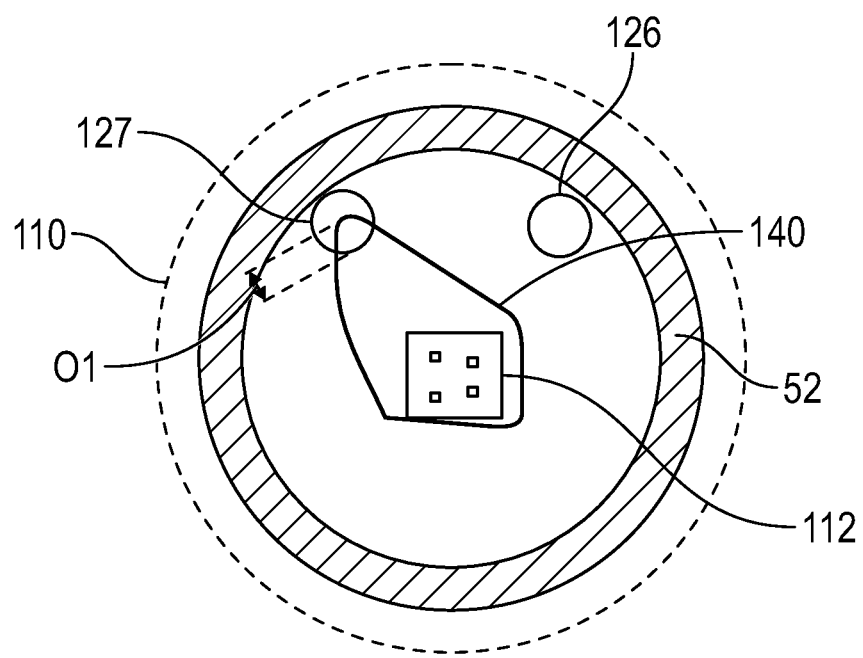
FIG. 7 is a schematic view of a diffuser during deployment and the potential overlap between the vent holes of the airbag and the diffuser.
Figure 8:
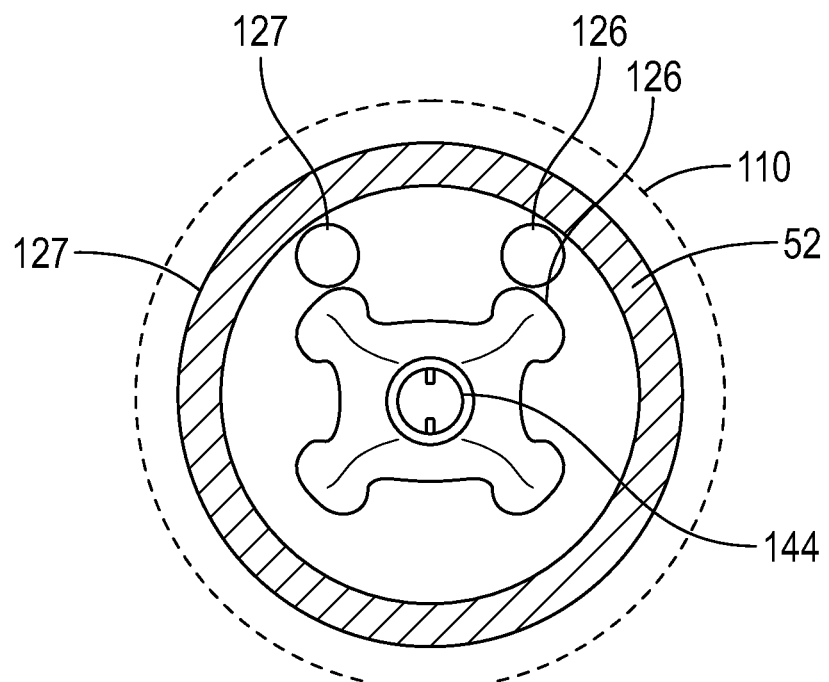
FIG. 8 is a schematic view of a diffuser with an aperture during deployment and the lack of overlap between the vent holes of the airbag and the diffuser.

FIG. 7 illustrates an overlap distance O1 that the diffuser 140 overlaps with the vent hole 126. The greater the overlap distance O1, the greater the pressure within the airbag 110 during ride down. This situation of overlap of the diffuser 140 with the vent hole 126 can be avoided when the aperture 144 is disposed in the second panel 142 of the diffuser. FIG. 8 illustrates a deployment of the diffuser 140 that includes the aperture 144 during deployment of the airbag 110. The aperture 144 functions to center the diffuser 140 during deployment by allowing airflow therethrough. Stated differently, the airflow through the aperture 144 centers the diffuser relative to the inflator aperture 143. Accordingly, the diffuser 140 can remain centered during ride down of the airbag 110. The centering of the diffuser 140 can prevent the diffuser 140 from overlapping the vent holes 126, 127 during deployment and ride down of the airbag 110 and preventing potential pressure spikes within the airbag 110.

The aperture 144 of the second panel 142 is also advantageous in the manufacturing process of the airbag 110. The manufacturing process and packaging of the airbag 110 ensures that the airbag 110 deploys in a stable and repeatable manner. To facilitate a stable and consistent deployment of the airbag 110, the center of the diffuser 140 and the center of the cushioning panel 120 are aligned during the manufacturing process. The cushioning panel 120 and the diffuser 140 may be temporarily sewn together in order to facilitate the centering of the cushioning panel 120 and the diffuser 140. The aperture 144 in the second panel 142 of the diffuser 140 allows a manufacturer to align the centers of the diffuser 140 and the cushioning panel 120. For example, the manufacturer may make a mark on the inner surface of the cushioning panel 120 through the aperture 144 and the inflator aperture 143 after the cushioning panel 120 and the base panel 122 are sewn together. This way, a manufacturer can initially align the centers of the diffuser 140 and the center of the cushioning panel 120 before stitching them together.

A manufacturer may confirm the alignment by sewing the cushioning panel 120 and the diffuser 140 together with a break seam, break stitch, tack stitch, or another similar method. The break seam decouples during deployment of the airbag 110, thereby releasing the cushioning panel 120 from the diffuser 140. The decoupling of the break seam may occur from the force provided by the inflation gas during inflation the airbag 110 during deployment.

In some embodiments, the cushioning panel 120 may further include an aperture (not shown) disposed in the center of the cushioning panel 120. The aperture in the cushioning panel 120 may serve the same alignment purpose as the aperture 144 in the diffuser 140. The manufacturer may use the three holes, the aperture in the cushioning panel 120, the aperture 144 in the diffuser 140, or the inflator opening 123 to align the airbag 110 during the manufacturing process. Once the airbag 110 is aligned, the manufacturer may temporarily sew the cushioning panel 120 to the diffuser 140 via a break seam, break stitch, tack stitch, and the like. In the embodiment that includes an aperture in the cushioning panel 120, the airbag assembly 100 further includes a flap (not shown) to close the aperture during deployment of the airbag 110 so that no inflation gas comes in contact with the occupant during airbag deployment.

Figure 9:
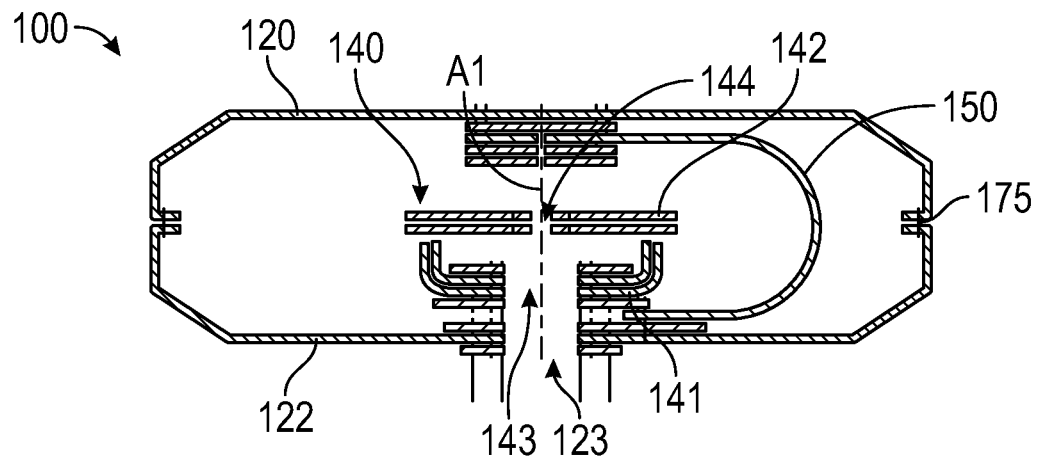
FIG. 9 is a cross-sectional view of an airbag assembly according to one embodiment.

FIG. 9 depicts a cross-sectional view of the airbag assembly 100 in a pre-packaged configuration. At this point in the manufacturing process, the airbag assembly 100 would be rolled, folded, etc., to a packaged configuration and placed within a housing that is placed within the steering wheel 52. As discussed previously, the airbag 110 of the airbag assembly 100 includes the cushioning panel 120 and base panel 122 that are coupled together via a seam 175. The diffuser 140 is disposed within the inflatable chamber 130 defined by the cushioning panel 120 and the base panel 122. The diffuser 140 includes the first panel 141 and the second panel 142. The centers of the cushioning panel 120, the aperture 144, the inflator aperture 143, and the inflator opening 123 are aligned along an axis A1. A break seam, break stitch, tack stitch, or another similar method (not shown) may be used temporality couple the diffuser 140 to the cushioning panel 120. The temporary coupling of the diffuser 140 and the cushioning panel 120 maintains the alignment of the diffuser 140 and the cushioning panel 120 during the remaining manufacturing process and installment of the airbag 110 into a vehicle.

In some embodiments, the airbag assembly 100 can further include a tether 150, which may be attached to the cushioning panel 120. The tether 150 may be referred to as a depth-delimiting tether and/or as a stabilizing tether. The tether 150 may assist with achieving a desired profile of the airbag 110 during deployment, once the airbag 110 is fully inflated, and/or during ride down of a vehicle occupant after the vehicle occupant impacts the inflated airbag 110, as discussed further below. The tether 150 may be formed of any suitable material, such as, for example, any of the materials discussed above with respect to the panels 120, 122. For example, in some embodiments, the tether 150 and the panels 120, 122 may be formed of the same material. In other embodiments, the tether 150 may be formed of a material that is stiffer, thicker, and/or stronger than the material of which the panels 120, 122 are formed.

Figure 10:
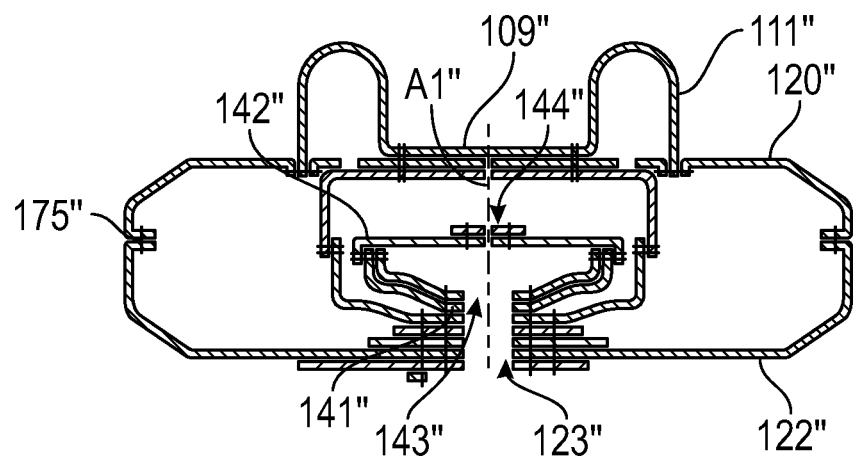
FIG. 10 is a cross-sectional view of an airbag assembly according to one embodiment.

FIG. 10 depicts a cross-sectional view of an airbag assembly 100" in a pre-packaged configuration according to one embodiment. The airbag assembly 100" includes an airbag 110" that comprises a cushioning panel 120" and a base panel 122" that are coupled together via a seam 175". A diffuser 140" of the airbag assembly 100" is disposed within an inflatable chamber 130" defined by the cushioning panel 120" and the base panel 122". The base panel 122" defines an inflator opening 123" that is disposed in the center of the base panel 122". The diffuser 140" includes a first panel 141" and a second panel 142". An inflator aperture 143" is disposed at a center of the first panel 141", and an aperture 144" is disposed in a center of the second panel 142". The centers of the cushioning panel 120", the aperture 144", the inflator aperture 143", and the inflator opening 123" are aligned along an axis A1".

The airbag assembly 100" may further include a pair of lobes 111" that are disposed on opposing sides of a center receiving area 109" that is configured to receive a head of an occupant. The lobes 111" may receive and/or contact or engage the head of the occupant and provide support to the sides of the head to counteract forces on the head that may cause rotation of the head clockwise or counterclockwise, such as may occur in an oblique crash condition. The airbag assembly 100" further includes two internal tethers 150" which facilitate deployment and formation of the lobes 111". The tethers 150" are secured to an interior of the airbag cushion at a forward portion of the airbag cushion (e.g., the base panel 122") and secured at an interior surface of the cushioning panel 120".

Figure 11:
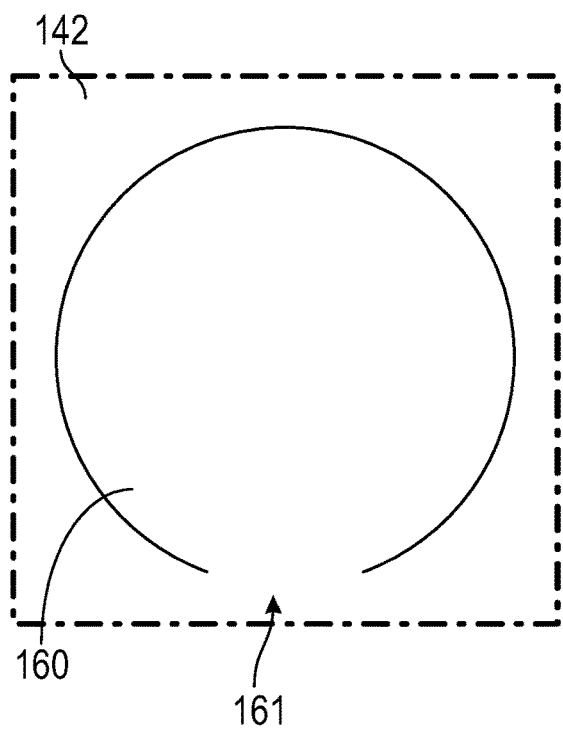
FIG. 11 depicts a schematic of a vent opening mechanism comprising a single flap according to one embodiment of the present disclosure.

In some embodiments, the aperture 144 of the second panel 142 may comprise a vent opening mechanism. In one embodiment, as illustrated in FIG. 11, the second panel 142 may comprise a flap 160 that overlaps the aperture 144. During deployment of the airbag 110, the flap 160 folds away from the aperture 144 along a hinge 161 by the inflation gas flowing through the aperture 144.

Figure 12:
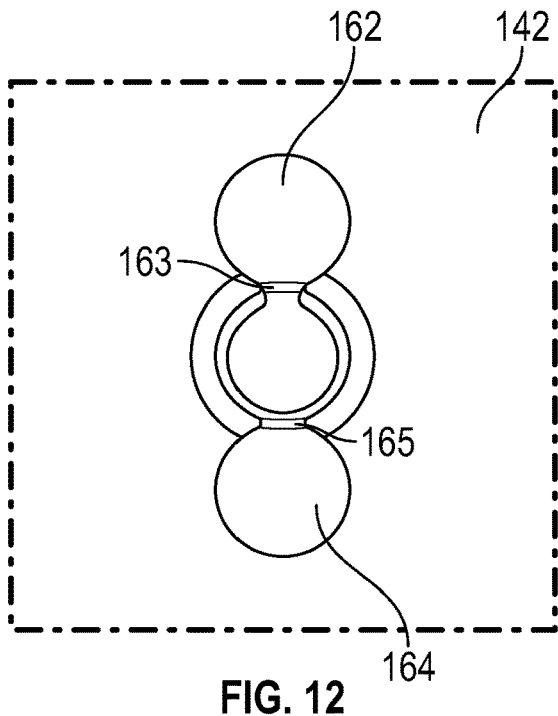
FIG. 12 depicts a schematic of a vent opening mechanism comprising dual flaps according to one embodiment of the present disclosure.

FIG. 12 illustrates another embodiment of a vent opening mechanism, a dual flap. The dual flap comprises a first flap 162 (e.g., an inner flap) and a second flap 164 (e.g., an outer flap). The first flap 162 is fabricated from a first layer of material of the second panel 142, and the second flap 164 is fabricated from a second layer of material of the second panel 142. The diameter of the first flap 162 is less than the diameter of the second flap 164. Accordingly, during deployment of the airbag 110, the first flap 162 and the second flap 164 fold away from the aperture 144 by inflation gas flowing through the aperture 144. Because the diameter of the first flap 162 is less than diameter of second flap 164, the first flap 162 is capable of passing through the aperture 144. The first flap 162 comprises a hinge 163 that is disposed on one side of the aperture 144, and the second flap 164 comprises a hinge 165 that is disposed on an opposite side of the aperture 144.

Figure 13A:
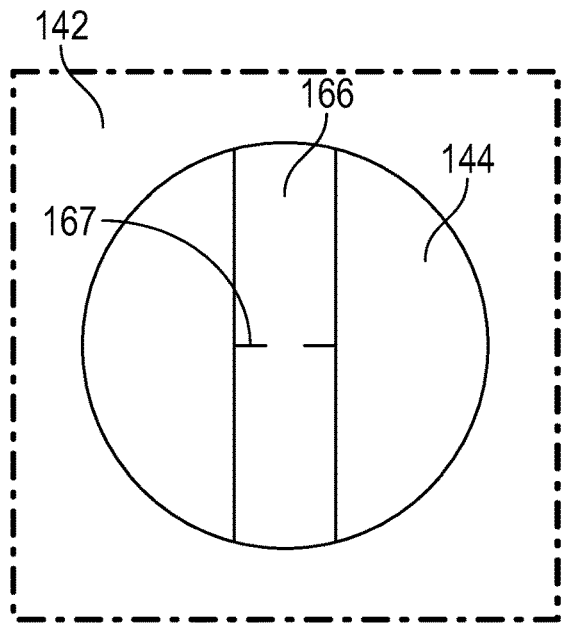
FIG. 13A depicts a schematic of a vent opening mechanism comprising a breakaway bridge in a pre-deployment configuration according to one embodiment of the present disclosure.
Figure 13B:
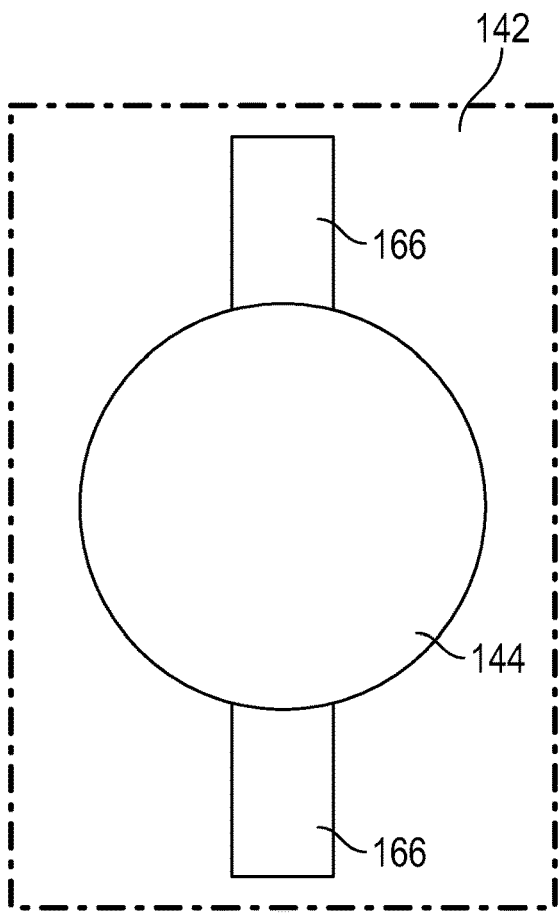
FIG. 13B depicts the vent opening mechanism of FIG. 13A in a post-deployment configuration.

FIGS. 13A and 13B depict a schematic view of a different embodiment of a vent opening mechanism. The vent opening mechanism depicted in FIGS. 13A and 13B is a breakaway bridge 166. The breakaway bridge 166 laterally extends across the aperture 144. FIG. 13A depicts the breakaway bridge 166 in a pre-deployment configuration, and FIG. 13B depicts the breakaway bridge 166 in a post-deployment configuration. The breakaway bridge 166 may include a perforated seam 167 that is configured to break during deployment of the airbag 110 by inflation gas flowing through the aperture 144.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

An inflatable airbag system comprising a housing configured to be mounted on a steering wheel of a vehicle; an inflator assembly at least partially disposed within the housing; an airbag operably coupled to the inflator assembly defining an inflatable chamber; and a diffuser disposed within the inflatable chamber in fluid communication with the inflator assembly, the diffuser includes an occupant-facing panel that includes an aperture disposed in the center of the occupant-facing panel of the diffuser, wherein, upon deployment, the occupant-facing panel deploys a predetermined distance away from the inflator assembly.

Example 2

The inflatable airbag system of example 1, wherein, upon deployment, the diffuser comprises a plurality of openings along a side of the diffuser, thereby enabling the diffuser to redirect the inflation gas laterally while allowing a portion of the inflation gas through the aperture.

Example 3

The inflatable airbag system of example 1, wherein a dimeter of the aperture is less than a diameter of the inflator assembly output.

Example 4

The inflatable airbag system of example 1, wherein the aperture comprises a breakaway bridge that extends across the aperture, the breakaway bridge configured to break during deployment of the airbag due to flow of the inflation gas through the aperture.

Example 5

The inflatable airbag system of example 1, wherein the aperture comprises a flap that overlaps the aperture, the flap configured to fold away from the aperture during deployment of the airbag due to flow of the inflation gas through the aperture.

Example 6

The inflatable airbag system of example 1, wherein the aperture comprises a first flap that overlaps the aperture and a second flap that overlaps the first flap, the first and second flaps configured to fold away from the aperture during deployment of the airbag due to flow of the inflation gas through the aperture.

Example 7

The inflatable airbag system of example 6, wherein the first flap and the second flap are coupled to a perimeter of the aperture, wherein the first flap is coupled to an opposing side of the second flap.

Example 8

The inflatable airbag system of example 1, wherein the airbag further comprises a plurality of vent holes disposed on a forward-facing surface of the airbag.

Example 9

The inflatable airbag system of example 8, wherein, in the deployed configuration, the vent holes are disposed within a perimeter of a steering wheel.

Example 10

The inflatable airbag system of example 8, wherein, during deployment of the airbag, alignment of the aperture and the inflator aperture prevents the diffuser from overlapping the plurality of vent holes during venting of the inflation gas through the plurality of vent holes.

Example 11

The inflatable airbag system of example 1, further comprising a tether, wherein a first end of the tether is coupled to the inflator assembly and a second end of the tether is coupled to the center of the occupant-facing panel.

Example 12

The inflatable airbag system of example 1, wherein the occupant-facing panel comprises a central receiving area to provide an impact surface configured to receive a head of an occupant during a collision event.

Example 13

The inflatable airbag system of example 12, further comprising a pair of lobes disposed on opposing sides of the central receiving area, the pair of lobes configured to inflate to extend rearward to engage opposing sides of the head of the occupant.

Example 14

A diffuser for an inflatable airbag comprising a first panel, a second panel, and an inflator. The first panel comprises an inflator aperture disposed in a center of the first panel, wherein the inflator aperture is configured for receiving an airbag inflator that provides the inflation gas to inflate the inflatable airbag; and a plurality of arms that extend away from a perimeter of the first panel. The second panel comprises a diffuser aperture disposed in the second panel; and a plurality of arms that extend away from a perimeter of the second panel, wherein, in a packaged configuration, the diffuser aperture and the inflator aperture are concentric. Each arm of the plurality of arms of the first panel couples to a corresponding arm of the plurality of arms of the second panel.

Example 15

The diffuser of example 14, wherein the diffuser aperture is disposed in the center of the second panel and wherein, in a deployed configuration, the diffuser aperture and the inflator aperture are concentric.

Example 16

The diffuser of example 14, wherein a diameter of the aperture is less than a diameter of the inflator aperture.

Example 17

The diffuser of example 14, wherein, in a deployed configuration, the second panel is spaced apart from the first panel and the first panel is coupled to the second panel via the plurality of arms.

Example 18

The diffuser of example 17, wherein, in the deployed configuration, a plurality of openings are disposed on a side of the diffuser between adjacent coupled arms, the second panel configured to redirect the inflation gas to the plurality of openings and the aperture in the second panel.

Example 19

The diffuser of example 14, wherein the aperture comprises a breakaway bridge that extends across the aperture, the breakaway bridge configured to break during deployment due to flow of the inflation gas through the aperture.

Example 20

The diffuser of example 14, wherein the aperture comprises a first flap that overlaps the aperture and a second flap that overlaps the first flap, the first and second flaps configured to fold away from the aperture during deployment due to flow of the inflation gas through the aperture.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

The phrases "attached to" and "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or an orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle seating position" refers to the position in which an occupant is generally positioned when seated in a seat of a vehicle. The term "occupant" refers to a person or crash test dummy within a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or an element does not necessarily imply the existence of a second or an additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag system comprising:
   a housing configured to be mounted on a steering wheel of a vehicle;
   an inflator assembly at least partially disposed within the housing;
   an airbag operably coupled to the inflator assembly defining an inflatable chamber; and
   a diffuser disposed within the inflatable chamber in fluid communication with the inflator assembly, the diffuser comprising:
      a first panel that includes an inflator aperture disposed in the center of the first panel of the diffuser to receive the inflator assembly and a plurality of arms that extend away from a perimeter of the first panel; and
      a second panel that includes a diffuser aperture disposed in the second panel and a plurality of arms that extend away from a perimeter of the second panel,
   wherein, upon deployment, the second panel deploys a predetermined distance away from the inflator assembly,
   wherein each arm of the plurality of arms of the first panel couples to a corresponding arm of the plurality of arms of the second panel defining a plurality of coupled arms, and
   wherein the plurality of coupled arms define a plurality of openings, each opening disposed between adjacent coupled arms in a deployed configuration.

2. The inflatable airbag system of claim 1, wherein, upon deployment, the diffuser comprises a plurality of openings along a side of the diffuser, thereby enabling the diffuser to redirect the inflation gas laterally while allowing a portion of the inflation gas through the aperture.

3. The inflatable airbag system of claim 1, wherein a diameter of the aperture is less than a diameter of an inflator assembly output.

4. The inflatable airbag system of claim 1, wherein the aperture comprises a breakaway bridge that extends across the aperture, the breakaway bridge configured to break during deployment of the airbag due to flow of the inflation gas through the aperture.

5. The inflatable airbag system of claim 1, wherein the aperture comprises a flap that overlaps the aperture, the flap configured to fold away from the aperture during deployment of the airbag due to flow of the inflation gas through the aperture.

6. The inflatable airbag system of claim 1, wherein the aperture comprises a first flap that overlaps the aperture and a second flap that overlaps the first flap, the first and second flaps configured to fold away from the aperture during deployment of the airbag due to flow of the inflation gas through the aperture.

7. The inflatable airbag system of claim 6, wherein the first flap and the second flap are coupled to a perimeter of the aperture, wherein the first flap is coupled to an opposing side of the second flap.

8. The inflatable airbag system of claim 1, wherein the airbag further comprises a plurality of vent holes disposed on a forward-facing surface of the airbag.

9. The inflatable airbag system of claim 8, wherein, in the deployed configuration, the vent holes are disposed within a perimeter of a steering wheel.

10. The inflatable airbag system of claim 8, wherein, during deployment of the airbag, alignment of the aperture and the inflator aperture prevents the diffuser from overlapping the plurality of vent holes during venting of the inflation gas through the plurality of vent holes.

11. The inflatable airbag system of claim 1, further comprising a tether, wherein a first end of the tether is coupled to the inflator assembly and a second end of the tether is coupled to the center of an outer cushion panel of the airbag.

12. The inflatable airbag system of claim 1, wherein an outer cushion panel of the airbag comprises a central receiving area to provide an impact surface configured to receive a head of an occupant during a collision event.

13. The inflatable airbag system of claim 12, further comprising a pair of lobes disposed on opposing sides of the central receiving area, the pair of lobes configured to inflate to extend rearward to engage opposing sides of the head of the occupant.

14. A diffuser for an inflatable airbag comprising:
   a first panel comprising:
      an inflator aperture disposed in a center of the first panel, wherein the inflator aperture is configured for receiving an airbag inflator that provides the inflation gas to inflate the inflatable airbag; and
      a plurality of arms that extend away from a perimeter of the first panel; and
   a second panel comprising:
      a diffuser aperture disposed in the second panel; and
      a plurality of arms that extend away from a perimeter of the second panel, wherein, in a packaged configuration, the diffuser aperture and the inflator aperture are concentric;
   wherein each arm of the plurality of arms of the first panel couples to a corresponding arm of the plurality of arms of the second panel to define a plurality of coupled arms,
   wherein the plurality of coupled arms define a plurality of openings, each opening of the plurality of openings disposed between adjacent coupled arms in a deployed configuration, and wherein the second panel is configured to redirect the inflation gas to the plurality of openings and the aperture in the second panel.

15. The diffuser of claim 14, wherein the diffuser aperture is disposed in the center of the second panel and wherein, in the deployed configuration, the diffuser aperture and the inflator aperture are concentric.

16. The diffuser of claim 14, wherein a diameter of the aperture is less than a diameter of the inflator aperture.

17. The diffuser of claim 14, wherein, in the deployed configuration, the second panel is spaced apart from the first panel and the first panel is coupled to the second panel via the plurality of arms.

18. The diffuser of claim 14, wherein the aperture comprises a breakaway bridge that extends across the aperture, the breakaway bridge configured to break during deployment due to flow of the inflation gas through the aperture.

19. The diffuser of claim 14, wherein the aperture comprises a first flap that overlaps the aperture and a second flap that overlaps the first flap, the first and second flaps configured to fold away from the aperture during deployment due to flow of the inflation gas through the aperture.

\* \* \* \* \*